Feb. 23, 1971   W. R. GOLDBACH   3,566,272
POWER SUPPLY SYSTEM FOR RADIO TRANSMITTER AND OTHER
LOADS ON A HIGH VOLTAGE CONDUCTOR
Filed Sept. 17, 1968   3 Sheets-Sheet 1
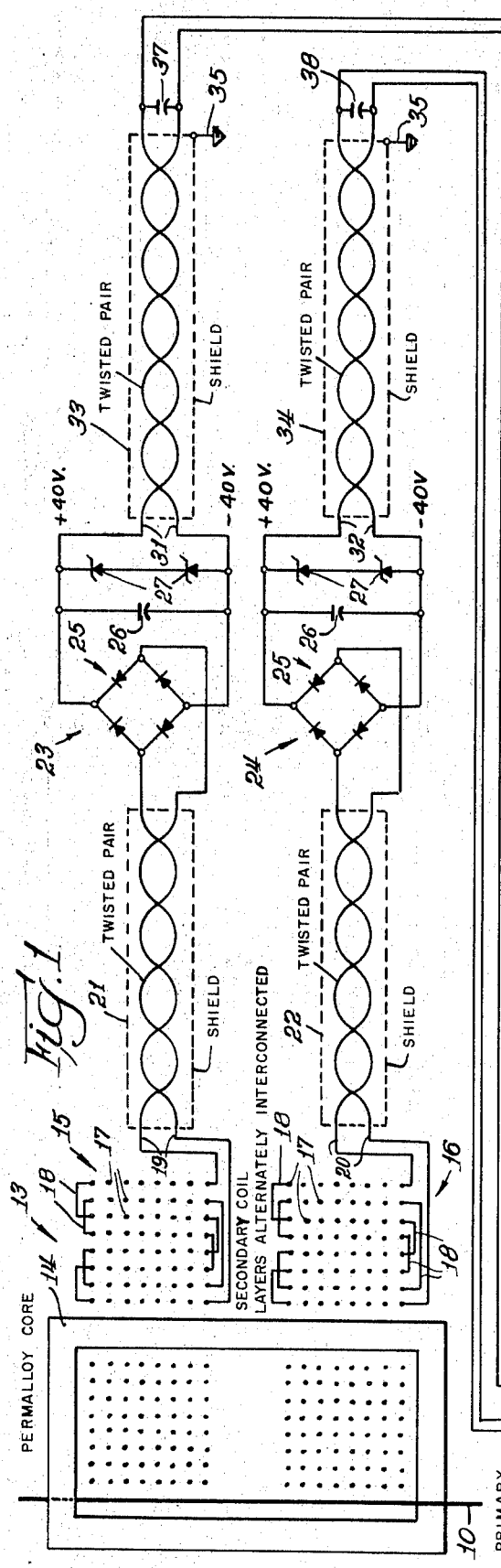
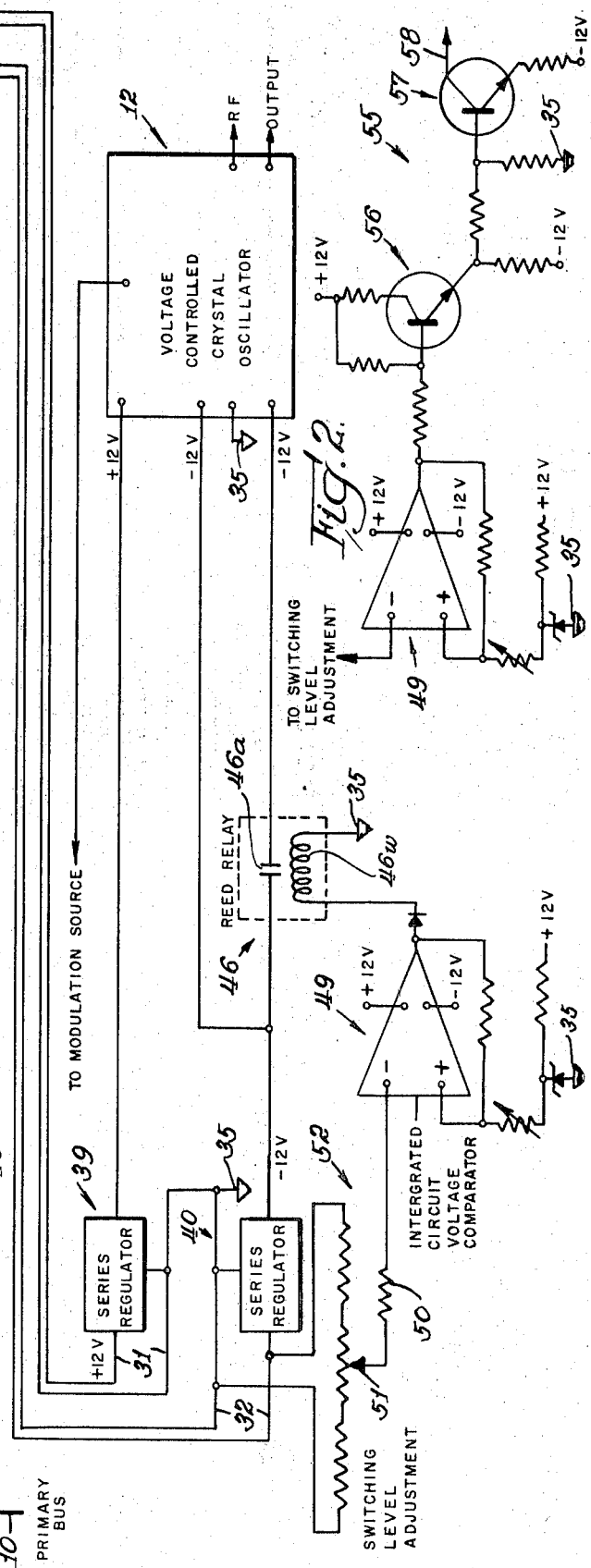

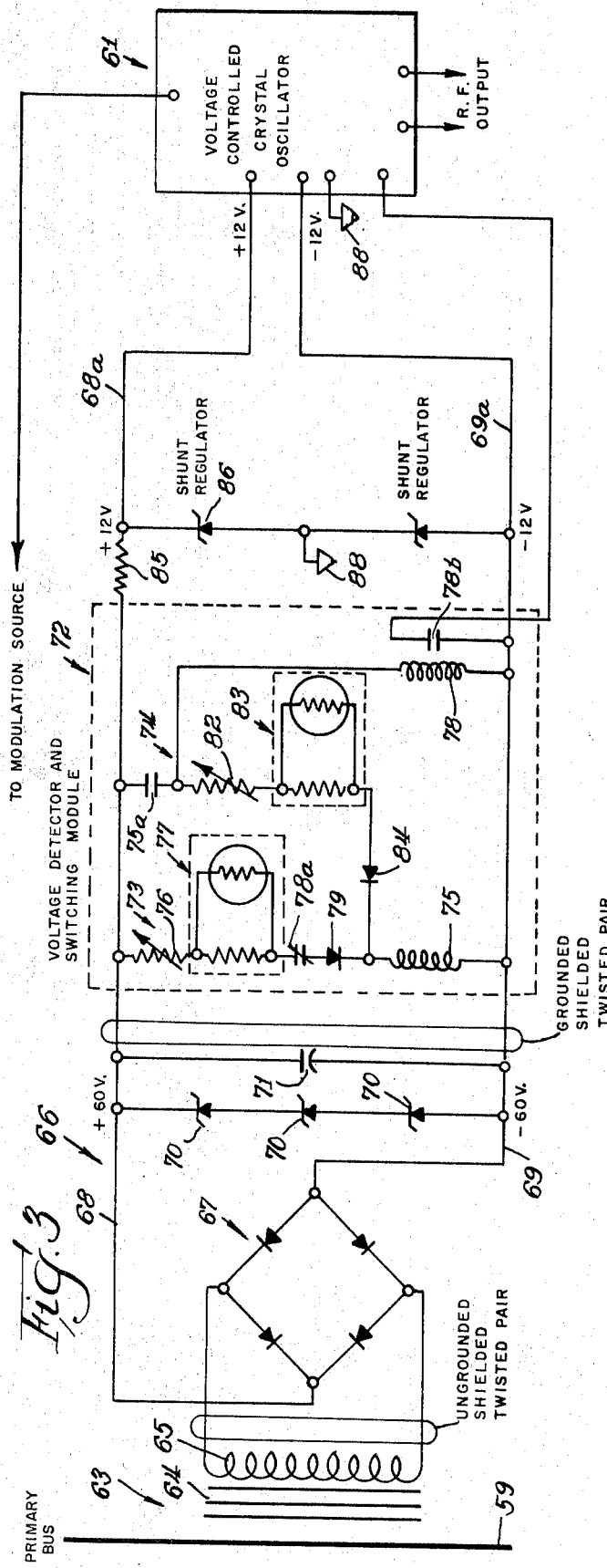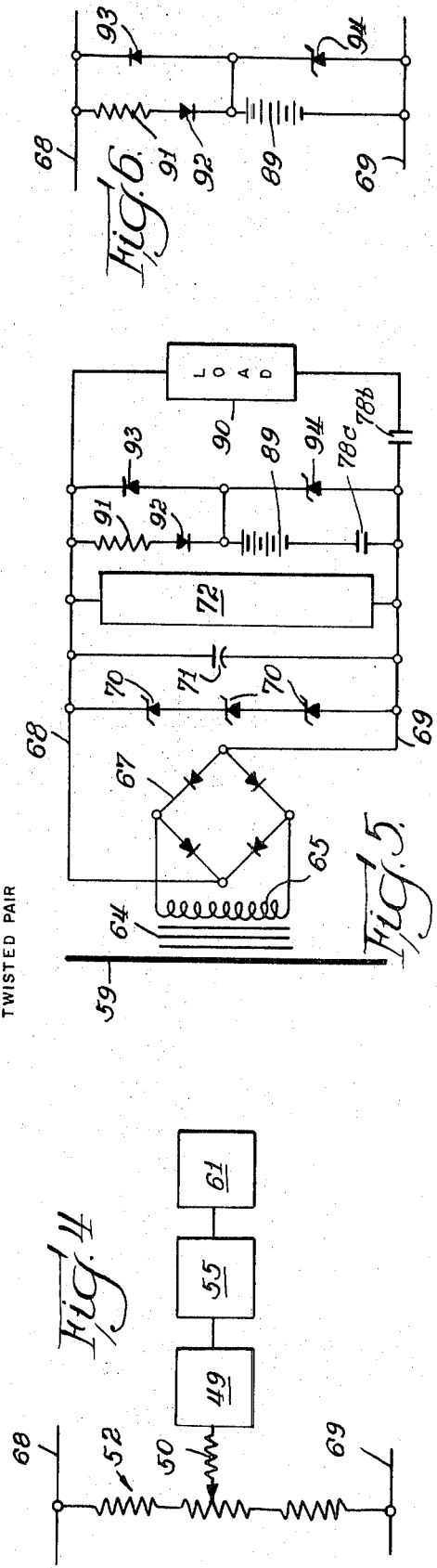

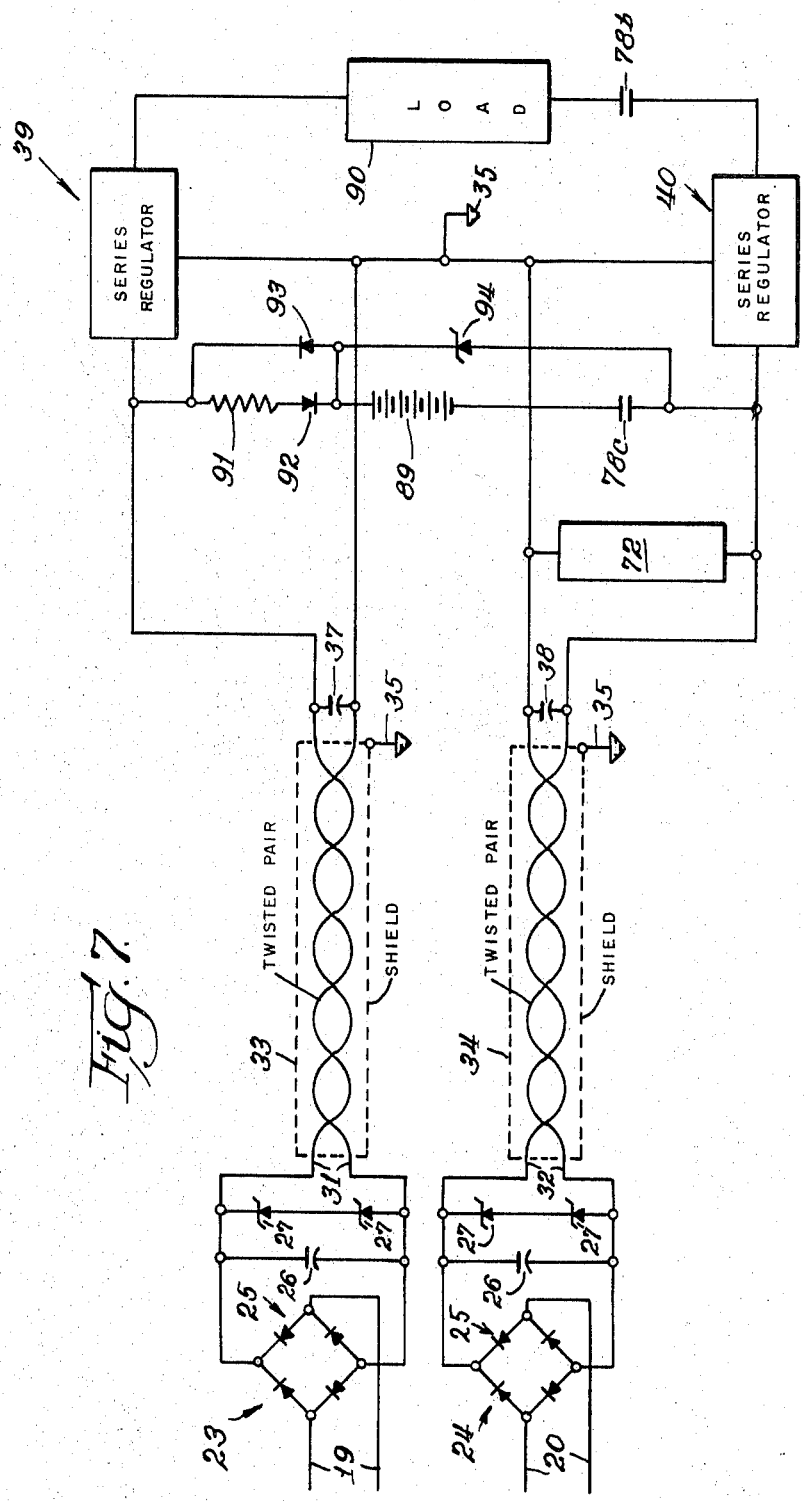

United States Patent Office

3,566,272
Patented Feb. 23, 1971

3,566,272
POWER SUPPLY SYSTEM FOR RADIO TRANSMITTER AND OTHER LOADS ON A HIGH VOLTAGE CONDUCTOR
William R. Goldbach, Des Plaines, Ill., assignor to S & C Electric Company, Chicago, Ill., a corporation of Delaware
Filed Sept. 17, 1968, Ser. No. 760,337
Int. Cl. H04b 1/02
U.S. Cl. 325—113                                   25 Claims

ABSTRACT OF THE DISCLOSURE

Unwanted radiation from the secondary winding of a single turn high voltage primary winding type of current transformer, employed for energizing a radio transmitter or other load mounted on a high voltage conductor forming the primary winding, is prevented by using the full number of turns of the secondary winding which is wound in coaxial layers with alternate layers connected in series. A twisted pair of shielded conductors interconnects the secondary winding and a preregulator that, in turn, is connected by a twisted pair of shielded conductors, the shield of which is connected to a common circuit connection, to a series regulator which energizes the transmitter or other load on operation of a voltage controlled relay or transistor switching circuit. Dual secondary windings and connections take care of the likelihood of exceeding the input voltage limits due to plural loads employing a series regulator for each load. Temperature compensated relays also provide a system for energizing the transmitter or other load from the secondary winding which can make use of the series connected coaxial layer would coil construction with the shielded twisted pairs of conductors. In lieu of the relays, a transistorized switching circuit is used. Provision is made for charging a battery to maintain the transmitter or other load in operation when the current flow in the high voltage conductor falls below a predetermined value.

CROSS-REFERENCE TO RELATED APPLICATION

This invention is an improvement over the system disclosed in Harner U.S. application Ser. No. 498,696, filed Oct. 20, 1965 now Pat. No. 3,460,042, issued Aug. 5, 1969.

SUMMARY OF THE INVENTION

Among the objects of this invention are: To minimize unwanted radiation from the second winding of a current transformer connected to energize a radio transmitter or other load mounted on a high voltage alternating current conductor, such as a conductor operating at voltages ranging upwardly to 1100 kv. and higher; to accomplish this, in part, by utilizing all of the turns of the secondary winding and, in part, by employing a coaxial layer wound secondary winding having alternate layers connected in series; to interconnect the secondary winding and a preregulator by a shielded twisted pair of conductors, and the preregulator and a series regulator by a shielded twisted pair of conductors the shield of which is connected to a common circuit connection; where dual loads are involved to employ duplicate secondary windings and shielded twisted pairs of conductors; to energize the transmitter by a relay or transistor controlled by the voltage applied to the series regulator; to employ temperature compensated relays for energizing the transmitter or other load from the secondary winding at one voltage and deenergizing it at a lower voltage; and to arrange for charging a battery to maintain the transmitter or other load energized when the current flow in the conductor falls below a predetermined value.

According to this invention provision is made for supplying power for energizing, from an alternating current carrying high voltage conductor or primary bus, a load such as a voltage controlled crystal oscillator that is employed in conjunction with a radio transmitter mounted on the conductor for transmitting a signal corresponding to a variable, for example current flow in the conductor, to a remote point at ground potential. A magnetic circuit links the conductor which constitutes a single turn primary winding. A secondary winding, comprising a relatively large number of turns, links the magnetic circuit. It has induced therein an alternating voltage corresponding to the current flow in the conductor. To reduce unwanted radiation from the secondary winding, provision is made to utilize all of the secondary turns for each installation. Further, to avoid a resonant condition resulting from the distributed capacitance and inductance of the secondary winding and change in the latter due to high saturation of the magnetic circuit, the secondary winding is wound in coaxial layers and alternate layers are connected in series. By employing all of the turns of the layers thus connected, the antenna effect of the secondary winding is reduced and there is a tendency for cancellation of the magnetic fields generated by current flow in the adjacent layers. For interconnecting the secondary winding and a preregulator a shielded twisted pair is used. The preregulator and the series or shunt regulators are interconnected by a shielded twisted pair with the shield connected to the common circuit connection. Improved regulation is obtained when driving separate loads through the provision of two coaxial layer wound secondary windings which are connected to individual preregulators in the manner above outlined. Series voltage regulators are interposed in the energizing circuit to the voltage controlled crystal oscillator to reduce power loss and consequent heating of the transmitter electronics module. This also results in faster turn on of the transmitter due to reduced power requirements. For turning on the transmitter or load, a reed relay module is used. The reed relay module is composed of temperature compensated reed relays, one for energizing the voltage controlled crystal oscillator on flow of predetermined current in the primary bus and the other for deenergizing it when current flow in the bus drops to a predetermined lower value. A shunt or series regulator is employed with the two relay switching system. Alternately, a voltage comparator responsive to the voltage across the winding of the transformer that is responsive to bus current is used with a transistorized switching circuit. Provision is made for charging a battery to maintain the transmitter energized when the current flow in the bus falls below a predetermined value.

In the drawings: FIG. 1 shows diagrammatically circuit connections that can be employed in using two coaxial layer wound secondary windings on a core linking a high voltage conductor or primary bus for energizing a load in the form of a voltage controlled crystal oscillator in a radio transmitter mounted on the conductor. FIG. 2 shows diagrammatically a transistor switching circuit that can be employed in lieu of the contact making relay shown in FIG. 1. FIG. 3 shows diagrammatically the circuit connections that can be employed using a voltage detector and switching module employing temperature compensated relays for controlling the energization and deenergization of the voltage controlled crystal oscillator. FIG. 4 shows diagrammatically how the switching transistor circuit of FIG. 2 can be employed in lieu of the relay switching circuit shown in FIG. 3. FIG. 5 shows a modification of the arrangement as illustrated in FIG. 3 in which a battery is maintained in charged condition to continue energization of a load, such as the voltage controlled crystal oscillator, in the event that the current flow in the primary bus falls below a certain value. FIG. 6 shows a modification of FIG. 5 in which the battery is not disconnected. FIG. 7 shows a further modification of FIG. 5.

Referring now to FIG. 1, reference character 10 designates a conductor or primary bus which may be one conductor of a three phase 60 Hz. high voltage electric power transmission line energized at voltages to 1100 kv. and higher. A radio transmitter is mounted on the conductor 10 and is arranged to be modulated as a function of the current flow therethrough for transmitting a signal to a remote point which corresponds to the magnitude of the current flow. The transmitter includes a voltage controlled crystal oscillator, indicated generally at 12, with which suitable modulation control is provided. The oscillator 12 is connected to a modulation source which is a variable of the conductor or primary bus 10 such as the current flow therein.

For energizing the oscillator 12 a current transformer, indicated generally at 13, is employed. The current transformer 13 has a single turn primary winding in the form of the conductor 10 which is linked by a magnetic core 14. Identical secondary windings 15 and 16 also link the core 14. Each of the windings 15 and 16 comprises a plurality of coaxial layers 17 each having a plurality of turns. The coaxial layers 17 are alternately connected in series as indicated at 18. Moreover, all of the turns of each of the secondary windings 15 and 16 are employed rather than utilizing a series of taps for various ratings. The reason for this is that any unused portion of the windings 15 and 16 would cause radiation of such nature as to produce distortion in the modulating signal applied to the oscillator 12. By connecting alternate layers 17 in series, the net magnetic field surrounding each of the windings 15 and 16 has a minimal effect on the adjacent components of the radio transmitter.

The end turns of the secondary windings 15 and 16 are connected by twisted pairs of conductors 19 and 20, having metallic foil shields 21 and 22, to preregulators that are indicated, generally, at 23 and 24 and are of identical construction. Each of the preregulators includes a bridge type rectifier, indicated generally at 25, having connected across its output terminals a capacitor 26 and voltage limiting Zener diodes 27. Twisted pairs of conductors 31 and 32 are connected to the output terminals of the bridge type rectifiers 25 and they extend through metallic foil shields 33 and 34 that are connected to a common circuit connection indicated at 35. Capacitors 37 and 38 are connected across the twisted pairs of conductors 31 and 32 as they leave the shields 33 and 34. The capacitors 37 and 38 function as high frequency filters for switching transients that may appear along the twisted pairs of conductors 31 and 32. The twisted pairs of conductors 31 and 32 are connected to series regulators 39 and 40 of conventional construction which, as indicated, are connected to the common circuit connection 35. The series regulators 39 and 40 are connected to energize the oscillator 11.

When contacts 46a of a reed relay, indicated generally at 46, are closed, they effect energization of the voltage controlled crystal oscillator 12. The reed relay 46 includes an operating winding 46w which is energized from an integrated circuit voltage comparator of conventional construction that is indicated, generally, at 49. The comparator 49 is energized through a resistor 50 which is connected by a sliding contact 51 to switching level adjustment means, indicated generally at 52, and connected for energization between the output of series regulator 40 and floating ground 35. The inherent operating characteristics of the reed relay 46 are such that its contacts 46a are closed at a higher voltage than the voltage at which they open on reduction of energization of the operating winding 46w.

An important reason for employing the two secondary windings 15 and 16 is to provide a positive and negative supply for the modulation circuitry of the oscillator 12 and to insure that the input voltage limits to the series regulators 39 and 40 are not exceeded due to unbalances in load applied by the modulation circuitry of the voltage controlled crystal oscillator 12. In those situations where a shunt regulator is used, this is not a factor. Then a single coaxial layer wound secondary winding 15 can be used with the voltage controlled crystal oscillator 12 connected for energization as illustrated in FIG. 3 to be described.

In FIG. 2 there is illustrated, generally, at 55 a transistor switching amplifier circuit to utilize the output of the integrated circuit voltage comparator 49 for effecting the energization of the voltage controlled crystal oscillator 12 in lieu of the reed relay 46. The switching circuit 55 includes NPN switching transistors 56 and 57. The collector of transistor 57 is connected by conductor 58 to the voltage controlled crystal oscillator 12.

In FIG. 3 there is indicated at 59 a conductor or primary bus which corresponds to the conductor 10 previously described. Arranged to be mounted on the conductor 59 is a radio transmitter that is modulated at a function of the magnitude of the current flow through the conductor 59. The radio transmitter includes a voltage controlled crystal oscillator that is indicated, generally, at 61.

The conductor 59 comprises a single turn primary winding of a current transformer that is indicated, generally, at 63 and includes a magnetic core 64 having a secondary winding 65 linking it. The construction of the transformer 63 can be similar to that described for the current transformer 13 with the secondary winding 65 preferably wound in coaxial layers with alternate layers connected in series and all of the turns employed.

A preregulator, indicated generally at 66, is connected for energization to the secondary winding 65 by a twisted pair of shielded conductors as indicated at 19–21 in FIG. 1. The preregulator 66 includes a bridge type rectifier shown, generally, at 67 and arrange to energize conductors 68 and 69 to opposite polarities as indicated as +60 volts and −60 volts. The preregulator 66 also includes series connected voltage limiting Zener diodes 70 and a capacitor 71 in shunt circuit relation therewith.

A voltage detector and switching module, indicated generally at 72, is connected for energization between the conductors 68 and 69 by a twisted pair of shielded conductors connected to the common circuit connection as shown at 31–33 in FIG. 1. It includes a turn on circuit, indicated generally at 73, and a turn off circuit that is indicated, generally, at 74. The turn on circuit 73, which is connected for energization between conductors 68 and 69 includes a first relay winding 75 of a reed type relay having normally open contacts 75a that are connected in series in the turn off circuit 74. The turn on circuit 73 also includes a variable resistor 76 which is employed to adjust the voltage at which the winding 75 is energized sufficiently to close contacts 75a. For insuring that the operation of the relay winding 75 is independent of temperature, a thermistor, shown generally at 77, is included in the turn on circuit 73 to compensate for change in the resistance of winding 75 due to temperature change. The turn on circuit 73 also includes normally closed contacts 78a of a second reed type relay having an operating winding 78 which is connected for energization between the conductors 68 and 69 on closure of contacts 75a. Normally open contacts 78b are closed on energization of the relay winding 78 to complete an energizing circuit for the voltage controlled crystal oscillator 61. The turn on circuit 73 also includes a diode 79 to isolate the turn on and turn off energizing circuits.

The turn off circuit 74 has as a part thereof a series connected variable resistor 82 which controls the voltage at which the relay winding 75 is deenergized sufficiently to permit opening of its contacts 75a. The arrangement is such that contacts 75a are closed at a higher voltage between the conductors 68 and 69 than the voltage therebetween at which these contacts are opened. The turn off circuit 74 also includes a thermistor that is indicated, generally, at 83 to compensate for change in the resistance of winding 75 due to temperature change and a diode 84 to isolate the turn on and turn off circuits.

A resistor 85 is connected in series with the conductor 68 to limit the current flow to diodes 86 and 87 which are connected between the resistor 85 and conductor 69 with a common reference point or floating ground 88 between these diodes. This provides a shunt regulator for the modulation circuitry contained in the oscillator 61 and provides the regulated +12 volts and −12 volts.

FIG. 4 shows how the transistor switching circuit 55, previously described, can be employed in lieu of the voltage detector and switching module 72 shown in FIG. 3. In FIG. 4 the integrated circuit voltage comparator 49 is connected to the switching level adjustment means 52 that, as shown, is connected between the conductors 68 and 69. As before, the transistor switching circuit 55 is adjusted in order to require a higher voltage between the conductors 68 and 69 for energizing the voltage controlled crystal oscillator 61 or other load than is required for maintaining it in operation.

FIG. 5 shows a further modification of the herein disclosed system for deriving power from the secondary winding of a current transformer in which the primary winding comprises a single turn, for example, the conductor or primary bus 59. The system here shown includes a battery 89 that is arranged to be charged when sufficient voltage is maintained between the conductors 68 and 69 from the bridge type rectifier 67. The battery 89 is employed for maintaining energized a load 90, which may be the voltage controlled crystal oscillator 61 previously referred to. It may be desirable to maintain the load 90 energized for an appreciable time after the current flow in the conductor or primary bus 59 falls below a value which is capable of otherwise maintaining the load 90 energized.

It will be observed in FIG. 5 that the voltage detector and switching module 72 is employed and it functions as previously described in response to application of voltage between the conductors 68 and 69. The battery 89 is arranged to be charged through a resistor 91 and a charging diode 92. Contacts 78c are operated by the relay winding 78 and, when closed, on energization of the winding 78 as previously described, complete the charging circuit for the battery 89. The discharge circuit for the battery 89 extends through a discharge diode 93 and the contacts 78b previously referred to. If desired a Zener diode 94 can be connected across the battery 89 to prevent excessive charging.

In operation, when the voltage applied to the conductors 68 and 69 as a result of current flow in the conductor or primary bus 59 falls to such a value that the battery 89 no longer is charged, the battery voltage is sufficient to maintain the voltage detector and switching module 72 in the energized condition. The load 90 continues to be energized until the voltage from the battery 89 is no longer capable of maintaining the voltage detector and switching module 72 in the energized condition. Thereupon contacts 78b are opened to disconnect the load 90 and contacts 78c are opened in order that the battery 89 will not be completely discharged.

The circuit arrangement shown in FIG. 6 can be employed in those situations where there is no anticipated period of no current flow in the conductor or primary bus 59 greater than the life of the battery 89. In that case, the contacts 78c can be omitted as indicated. Otherwise the circuit is identical with that shown in FIG. 5.

FIG. 7 shows how the series regulators 39 and 40, energized as illustrated in FIG. 1, can be employed for energizing the load 90 and for charging the battery 89 as shown in FIG. 5. The voltage detector and switching module 72 functions in the manner described for FIG. 5 to control the operation of contacts 78b for controlling the energization of the load 90 and of contacts 78c for connecting and disconnecting the battery 89.

What is claimed as new is:
1. In a power supply system, in combination:
   a conductor at any voltage for carrying alternating current,
   a magnetic core linking said conductor,
   a winding linking said core,
   a preregulator connected to said winding,
   a load circuit connected to said preregulator,
   regulator means connected between said preregulator and said load circuit, and
   switch means connected between said preregulator and said load circuit including:
      a first relay having an operating winding and normally open contacts,
      a second relay having an operating winding connected for energization to said preregulator on closure of said normally open contacts of said first relay, having normally closed contacts, and having normally open contacts for connecting said load circuit for energization to said preregulator,
      a turn-on circuit connecting said operating winding of said first relay for energization to said preregulator through said normally closed contacts of said second relay, and
      a turn-off circuit connecting said operating winding of said first relay for energization to said preregulator through said normally open contacts of said first relay.

2. The system according to claim 1 wherein means are connected in said turn-on circuit for varying the voltage at which said operating winding of said first relay is energized to close its contacts, and means are connected in said turn-off circuit for varying the voltage at which said operating winding of said first relay is deenergized sufficiently to open its contacts.

3. In a power supply system in combination:
   a conductor at any voltage for carrying alternating current,
   a magnetic core linking said conductor,
   a winding linking said core,
   a preregulator connected to said winding,
   a load circuit connected to said preregulator,
   regulator means connected between said preregulator and said load circuit,
   switch means connected between said preregulator and said load circuit including:
      a first relay having an operating winding and normally open contacts,
      a second relay having an operating winding connected for energization to said preregulator on closure of said normally open contacts of said first relay, having normally closed contacts, and having normally open contacts for connecting said circuit for energization to said preregulator,
      a turn-on circuit connecting said operating winding of said first relay for energization to said preregulator through said normally closed contacts of said second relay, and
      a turn-off circuit connecting said operating winding of said first relay for energization to said preregulator through said normally open contacts of said first relay,
   means connected in said turn-on circuit for varying the voltage at which said operating winding of said relay is energized to close its contacts,
   means connected in said turn-off circuit for varying the voltage at which said operating winding of said first relay is deenergized sufficiently to open its contacts, and
   temperature responsive means connected in said turn-on circuit and in said turn-off circuit to maintain the voltage applied to said operating winding of said first relay substantially independent of change in temperature.

4. The system according to claim 3 wherein said turn-on circuit is characterized by causing said normally open contacts of said second relay to be closed at a higher voltage from said preregulator than the voltage at which they are opened by said turn-off circuit.

5. The system according to claim 4 wherein
 a chargeable battery is connected to be charged from said preregulator when current flow in said conductor exceeds a predetermined value for maintaining said load circuit energized when said current flow in said conductor falls below said predetermined value, and
 said second relay has another set of normally open contacts connected in series with said battery to disconnect it when its voltage falls below a predetermined value.

6. In a power supply system, in combination:
 a conductor at any voltage for carrying alternating current,
 a magnetic core linking said conductor,
 a winding linking said core,
 a preregulator connected to said winding,
 a load circuit connected to said preregulator, and
 a chargeable battery connected to be charged from said preregulator when current flow in said conductor exceeds a predetermined value for maintaining said load circuit energized when said current flow in said conductor falls below said predetermined value.

7. The power supply system according to claim 6 wherein regulator means is connected between said battery and said load circuit.

8. The power supply system according to claim 6 wherein regulator means is connected between said preregulator and said load circuit, switch means is connected between said preregulator and said load circuit, and switch means is connected in series with said battery to disconnect it when its voltage falls below a predetermined value.

9. In a power supply system, in combination:
 a conductor at any voltage for carrying alternating current,
 a magnetic core linking said conductor,
 a winding linking said core,
 a preregulator connected to said winding,
 a load circuit connected to said preregulator, and regulator means connected between said preregulator and said load circuit,
 said winding comprising a multilayer coil wound in coaxial layers, each layer comprising a plurality of turns and alternate layers being connected in series.

10. The power supply system according to claim 9 wherein all of the turns of all of said layers are connected across said preregulator whereby there are no unused turns.

11. In a power supply system, in combination:
 a conductor at any voltage for carrying alternating current,
 a magnetic core linking said conductor,
 a winding linking said core,
 a preregulator connected to said winding,
 a load circuit connected to said preregulator,
 regulator means connected between said preregulator and said load circuit,
 a first shielded twisted pair of conductors interconnecting said winding and said preregulator, and
 a second shielded twisted pair of conductors interconnecting said preregulator and said regulator means.

12. The power supply system according to claim 11 wherein said winding is a multilayer coil wound in coaxial layers, each layer comprising a plurality of turns and alternate layers being connected in series, and all of the turns of all of said layers are connected across said preregulator whereby there are no unused turns.

13. The power supply system according to claim 12 wherein switch means is connected between said preregulator and said load circuit.

14. The power supply system according to claim 13 wherein:
 a chargeable battery is connected to be charged from said preregulator when current flow in said conductor exceeds a predetermined value for maintaining said load circuit energized when said current flow in said conductor falls below said predetermined value, and
 switch means is connected in series with said battery to disconnect it when its voltage falls below a predetermined value.

15. In a power supply system, in combination:
 a conductor at any voltage for carrying alternating current,
 a magnetic core linking said conductor,
 a winding linking said core,
 a preregulator connected to said winding,
 a load circuit connected to said preregulator,
 regulator means connected between said preregulator and said load circuit,
 a second winding linking said core,
 a second preregulator energized from said second winding,
 a second regulator connected to said load circuit,
 first shielded twisted pairs of conductors interconnecting respectively said windings and said preregulators,
 second shielded twisted pairs of conductors interconnecting respectively said preregulators and said regulator means, and
 the shields of said second twisted pairs of conductors being connected to a common reference point.

16. The power supply system according to claim 15 wherein each of said windings is a multilayer coil wound in coaxial layers, each layer comprises a plurality of turns, alternate layers are connected in series, and all of the turns of all of said layers of each of said coils are connected across the respective preregulator whereby there are no unused turns in either coil.

17. The power supply system according to claim 16 wherein:
 switch means is connected between one of said regulators and said load circuit,
 a chargeable battery is connected to be charged from said preregulators when current flow in said conductor exceeds a predetermined value for maintaining said load circuit energized when said current flow in said conductor falls below said predetermined value, and
 switch means is connected in series with said battery to disconnect it from said load circuit when its voltage falls below a predetermined value.

18. In a system for transmitting a signal to a remote point corresponding to a variable in a high voltage alternating current carrying conductor in which an oscillator is modulated according to said variable, means for energizing said oscillator comprising:
 a magnetic core linking said conductor,
 a winding linking said core,
 a preregulator connected to said winding,
 regulator means connected to said preregulator for energizing said oscillator,
 a first shielded twisted pair of conductors interconnecting said winding and said preregulator,
 a second shielded twisted pair of conductors interconnecting said preregulator and said regulator means,
 said winding being a multilayer coil wound in coaxial layers, each layer comprising a plurality of turns, and alternate layers being connected in series, all of the turns of all of said layers being connected across said preregulator whereby there are no unused turns, and
 switch means connected between said preregulator and said oscillator.

19. In a system for transmitting a signal to a remote point corresponding to a variable in a high voltage alternating current carrying conductor in which an oscillator is modulated according to said variable, means for energizing said oscillator comprising:
- a magnetic core linking said conductor,
- a winding linking said core,
- a preregulator connected to said winding,
- regulator means connected to said preregulator for energizing said oscillator,
- a second winding linking said core,
- a second preregulator energized from said second winding,
- a second regulator connected to said load circuit,
- first shielded twisted pairs of conductors interconnecting respectively said windings and said preregulators,
- second shielded twisted pairs of conductors interconnecting respectively said preregulators and said regulator means,
- the shields of said second twisted pairs of conductors being connected to a common reference point,
- each of said windings being a multilayer coil wound in coaxial layers, each layer comprising a plurality of turns, and alternate layers being connected in series,
- all of the turns of all of said layers of each of said coils being connected across the respective preregulator whereby there are no unused turns in either coil, and
- a transistor switching circuit connected between said regulator means and said oscillator.

20. The system according to claim 19 wherein voltage comparator means is connected to said preregulator for controlling said transistor switching circuit to energize said oscillator on flow of predetermined current in said conductor.

21. The system according to claim 19 wherein said oscillator is energized on closure of normally open contacts of a relay having an operating winding energized from one of said preregulators to close said contacts.

22. The system according to claim 21 wherein
- a chargeable battery is connected to be charged from said preregulators when current flow in said conductor exceeds a predetermined value for maintaining said oscillator energized when said current flow in said conductor falls below said predetermined value, and
- contacts on said relay connected in series with said battery are opened to disconnect it from said oscillator when its voltage falls below a predetermined value.

23. The system according to claim 19 wherein voltage comparator means is connected to said preregulator for controlling said transistor switching circuit to energize said oscillator on flow of predetermined current in said conductor.

24. The system according to claim 19 wherein said oscillator is energized on closure of normally open contacts of a relay having an operating winding energized from said preregulator to close said contacts.

25. In a system for transmitting a signal to a remote point corresponding to a variable in a high voltage alternating current carrying conductor in which an oscillator is modulated according to said variable, means for energizing said oscillator comprising:
- a magnetic core linking said conductor,
- a winding linking said core,
- a preregulator connected to said winding,
- regulator means connected to said preregulator for energizing said oscillator,
- a second winding linking said core,
- a second preregulator energized from said second winding,
- a second regulator connected to said load circuit,
- first shielded twisted pairs of conductors interconnecting respectively said windings and said preregulators,
- second shielded twisted pairs of conductors interconnecting respectively said preregulators and said regulator means,
- the shields of said second twisted pairs of conductors being connected to a common reference point,
- each of said windings being a multilayer coil wound in coaxial layers, each layer comprising a plurality of turns, and alternate layers being connected in series,
- all of the turns of all of said layers of each of said coils being connected across the respective preregulator whereby there are no unused turns in either coil, and
- voltage comparator means connected to said preregulator for controlling said transistor switching circuit to energize said oscillator on flow of predetermined current in said conductor.

References Cited
UNITED STATES PATENTS

| | | | |
|---|---|---|---|
| 3,275,892 | 9/1966 | Schweitzer, Jr. | 325—113 |
| 3,460,042 | 8/1969 | Harner | 325—67 |
| 3,491,299 | 1/1970 | Garber et al. | 325—113 |

RICHARD MURRAY, Primary Examiner

A. H. EDDLEMAN, Assistant Examiner